United States Patent [19]

Spillman, Jr.

[11] Patent Number: 5,365,359
[45] Date of Patent: Nov. 15, 1994

[54] METHOD FOR ELECTRICALLY PASSIVE SELF-ROUTING OPTICAL MULTIPLEXING

[75] Inventor: William B. Spillman, Jr., Vergennes, Vt.

[73] Assignee: Catamount Scientific, Inc., Charlotte, Vt.

[21] Appl. No.: 61,544

[22] Filed: May 14, 1993

[51] Int. Cl.$^5$ ............................................. H04J 14/08
[52] U.S. Cl. ................................. 359/139; 359/117; 250/227.12; 385/12
[58] Field of Search ............... 359/110, 117, 123, 128, 359/139, 166, 173; 250/227.12, 227.19, 214.25; 356/345; 385/12

[56] References Cited

U.S. PATENT DOCUMENTS

| | | | |
|---|---|---|---|
| 4,085,321 | 4/1978 | Sliva | 250/214 LS |
| 4,775,216 | 10/1988 | Layton | 250/227.12 |
| 4,784,453 | 11/1988 | Shaw et al. | 359/173 |
| 5,011,262 | 4/1991 | Layton | 385/12 |
| 5,028,801 | 7/1991 | Gerdt | 250/227.12 |
| 5,030,824 | 7/1991 | Babbitt | 250/227.12 |
| 5,062,153 | 10/1991 | Turpin et al. | 250/227.19 |
| 5,071,214 | 12/1991 | Jacob et al. | 385/12 |
| 5,109,296 | 4/1992 | Fukushima et al. | 359/110 |
| 5,140,154 | 8/1992 | Yurek et al. | 250/227.12 |
| 5,173,743 | 12/1992 | Kim | 250/227.19 |

OTHER PUBLICATIONS

Dandrige et al., "Multiplexed Interferometric Fiber Sensor Arrays", SPIE vol. 1586, 1991, pp. 176–183.

Primary Examiner—Richard E. Chilcot, Jr.
Assistant Examiner—Kinfe-Michael Negash
Attorney, Agent, or Firm—John J. Welch

[57] ABSTRACT

What is hereof proffered is a method and apparatus for optically multiplexing together a plurality of optical modulation devices on a limited number of optical transmission paths utilizing electrically passive photo-activated optical switches. The switches have the characteristic that prior to illumination, an input channel is coupled to a specific output channel. Following illumination, after a characteristic time delay, t, a first switch activates so that the input channel is disconnected from the first output channel and connected to a second output channel. It remains connected to the second output channel until the illumination is removed at which time the input channel is disconnected from the second output channel and reconnected to the first output channel. The switches are arranged sequentially along an outwardly directed optical transmission path. When optical power is coupled into the path, as it reaches each switch, the total power is sequentially switched off the path into alternate optical transmission paths and then coupled back onto the outwardly directed optical transmission path. An optical modulator on each alternate optical transmission path modulates the optical signal through it. The modulated optical signals are directed to a signal processing location along one or more inwardly directed optical transmissions paths. At the signal processing location, time windowing demodulates the signals from each modulation device.

13 Claims, 5 Drawing Sheets

METHOD FOR ELECTRICALLY PASSIVE SELF-ROUTING OPTICAL MULTIPLEXING

REFERENCE TO PRIOR APPLICATIONS

There are no prior or parent applications in respect of or related to the instant invention.

FEDERALLY SPONSORED RESEARCH AND DEVELOPMENT

There is no federally sponsored research and development in any way related to the instant invention.

POSSIBLE PRIOR ART

The following references are examples of possible prior art that however, respectfully submitted, does not anticipate the instant invention:

| Inventor | Invention | Pat. No. | Date |
|---|---|---|---|
| Layton | Fiber Optic Sensor Array and Method | 4,775,216 | 10/04/88 |
| Shaw, et al | Backward-Flow Ladder Architecture and Method | 4,784,453 | 11/15/88 |
| Layton | Fiber Optic Sensor Array | 5,011,262 | 4/30/91 |
| Babbitt | Optical Position Sensor Employing Encoder Delay | 5,030,824 | 7/09/91 |
| Turpin, et al | Reading Device of Polarmetric and Interfeometric Sensors | 5,062,153 | 10/29/91 |
| Silva | Multi-phase Photoactivated Switch | 4,085,321 | 4/18/78 |

Paper: Multiplexed Interferometric Fiber Sensor Arrays, SPIE Vol. 1586 "Distributed and MMultiplexed Fiber Optic Sensors" (1991) – A copy of the paper is enclosed herewith.

BACKGROUND OF THE INVENTION

1. Field of the Invention

The instant invention is one that is related to that group of devices that function to effectuate remote interrogation via the multiplexing of switching devices.

2. Brief Description of the Invention

The instant invention constitutes a method and apparatus for time division multiplexing a number of optical modulation devices on a limited number of optical transmission paths. This function is accomplished by way of the utilization of electrically unpowered photoactivated optical switches that segmentially direct available optical power to successive points remote in location relative to the locus of an optical power source. The invention consists of control and signal processing electronics, an optical power source, an outwardly directed optical transmission path, a plurality of electrically unpowered photoactivated optical switches positioned along said outwardly directed transmission path, a plurality of optical modulation devices positioned one each apropos each said switch, such that each such device is positioned on each one of a plurality of alternate optical transmission paths, one or more inwardly directed optical transmission paths, a plurality of optical coupling devices (one per optical modulation device) positioned one each along the one or each one of said inwardly directed optical transmission paths, and a photodetector module interfaced as is the invention's power source component with the invention's control and signal processing electronics.

3. Objects of the Invention

Successive interrogations of each one of a series of sensors along a pathway on which they are positioned has heretofore required the use of couplers that are either electrically active or electrically passive. Passive variants can be so utilized at much lower costs than active ones. Moreover, resort to passive variants operates to significantly reduce the effects of any interchannel crosstalk that can serve to greatly enhance the unreliability of collected data transmissions. But, a problem heretofore with respect to resort to such passive variants has been a virtually exponential loss of power directed from a power source with increasing remoteness therefrom along an outwardly directed path as quanta of power would be successively siphoned off by way of the invariable routing of some of the available power at the locus of each such coupler to an alternate transmission path thereby leaving less total power available at the site of the next remote coupler along such outwardly directed path.

The instant invention is virtually revolutionary within the field of such devices, since, it utilizes electrically passive switches rather than couplers that serve to accomplish routing of power along alternate transmission paths without concomitant loss of power available to the next remote switch along the outwardly directed path on which said switches are found. Thus cost and crosstalk are greatly minimized resulting in the concomitant availability of much larger quantities of sensed data from a greatly increased number of sensor sites that is inherently more reliable for much less cost than can be obtained with resort to the utilization of related sensing systems currently in vogue.

DETAILED DESCRIPTION OF THE PREFERRED EMBODIMENTS

Figure 1:
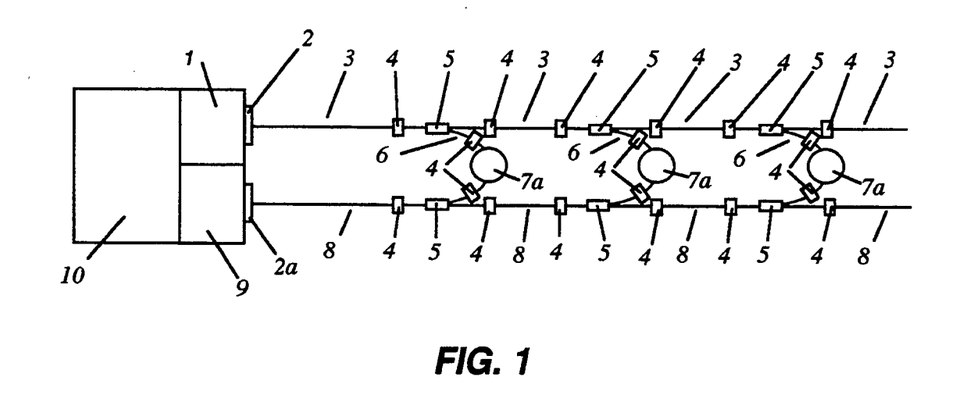
FIG. 1 is a schematic diagram of an optical power division transmissive optical multiplexing system.
Figure 2:
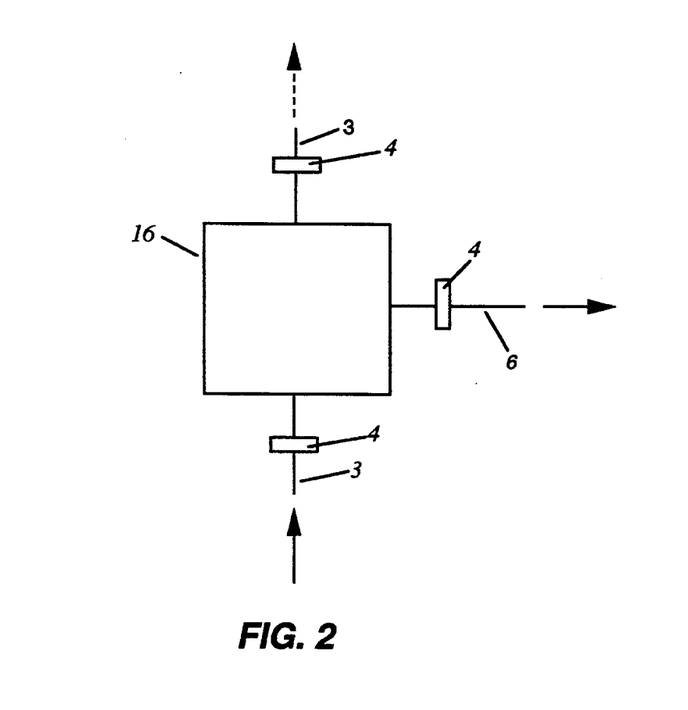
FIG. 2 is a schematic diagram of a generic electrically passive photoactivated optical switch.

FIG. 1 is a schematic diagram of an optical power division transmissive optical multiplexing system. This system is one that has been used for numerous and varied multiplexing operations for a number of years now. The primary objection as respects this particular type of system is the marked limitation on the number of optical modulation devices that can be multiplexed when such a system is utilized for purposes of the same. The instant invention constitutes a marked improvement over such a system in that the instant invention contemplates resort to the utilization of electrically passive photoactivated switches rather than mere passive optical splitter/combiners or couplers 5 on an outwardly directed optical transmission path 3 in order to actively route all available optical power through each such optical modulation device in turn thereby greatly increasing the number of such optical modulating devices that can be multiplexed. FIG. 2 is a schematic diagram of a generic variant of such electrically passive photoactivated optical switches as are utilized in the instant invention. The self-routing time division multiplexing technique according to the present invention is based upon the use of electrically passive photoactivated switches that have the characteristic that in the absence of illumination, each one's input channel is connected to a given output channel. A characteristic time, t, after illumination, each input channel is disconnected from the given output channel and reconnected to a second output channel. The switches remain in this state until the illumination is removed at which time they revert to their original state.

Figure 3:
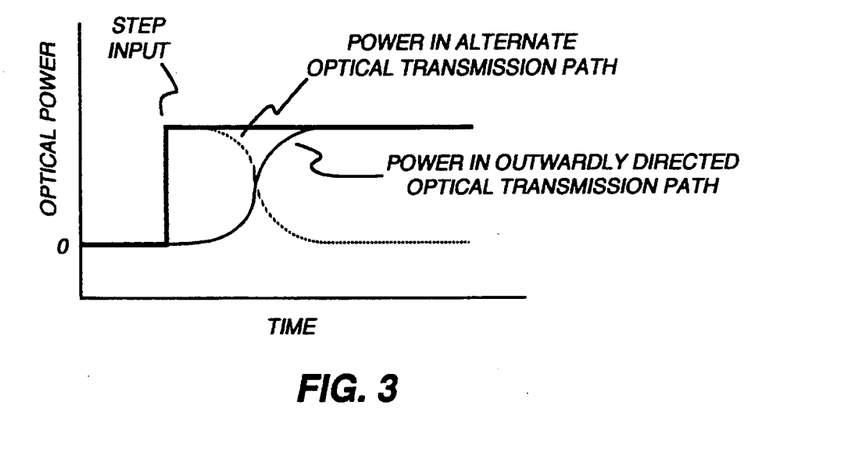
FIG. 3 is a graph illustrating the operation of the generic electrically passive photoactivated optical switch shown in FIG. 2.
Figure 4:
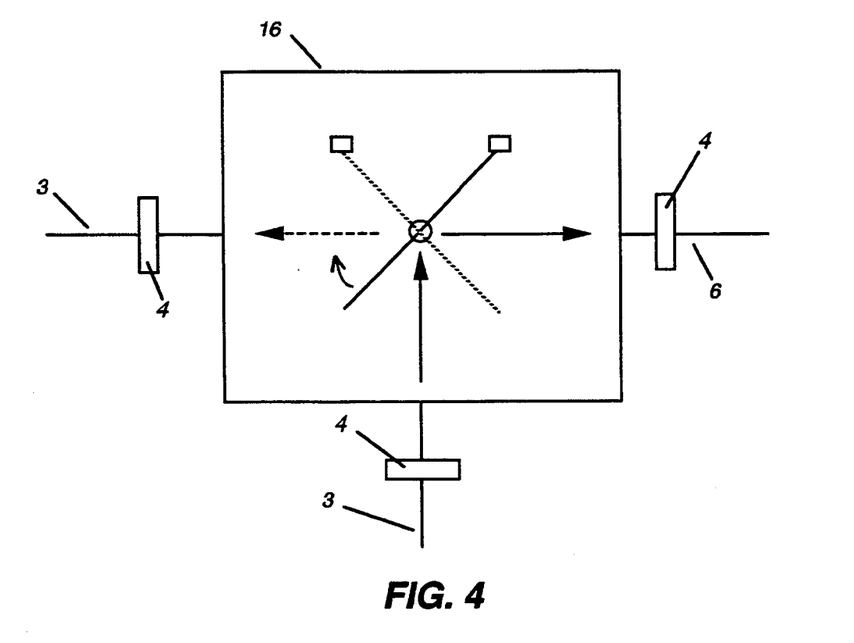
FIG. 4 is a schematic depiction of an example of an opto-mechanical version of an electrically passive photoactivated optical switch.
Figure 5:
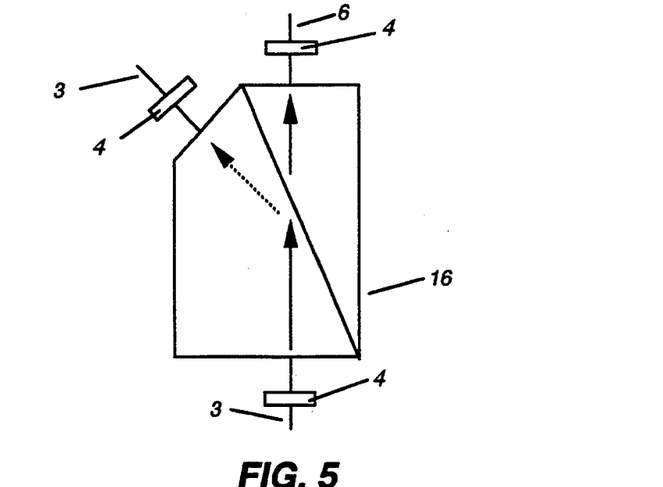
FIG. 5 is a schematic depiction of an example of a bulk optic version of an electrically passive photoactivated optical switch.
Figure 6:
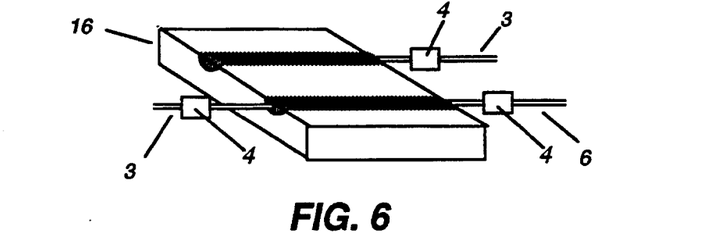
FIG. 6 is a schematic depiction of an example of an integrated optic version of an electrically passive photoactivated optical switch.
Figure 7:
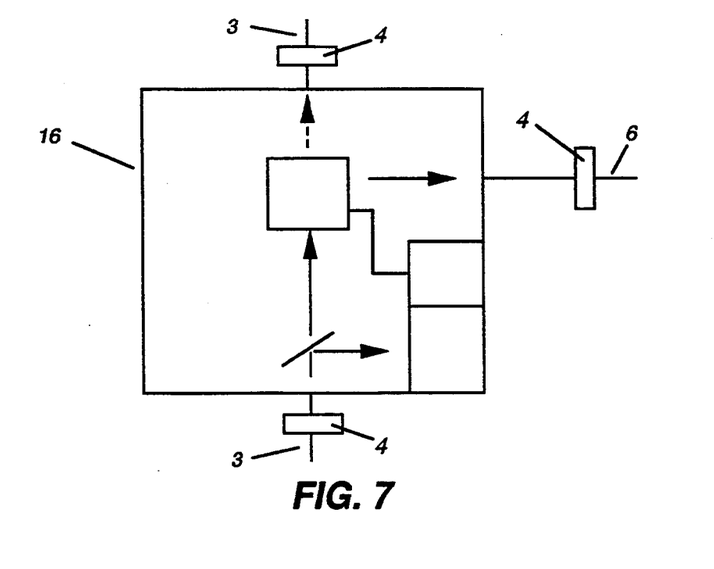
FIG. 7 is a schematic depiction of an example of a hybrid opto-electronic version of an electrically passive photoactivated optical switch.
Figure 8:
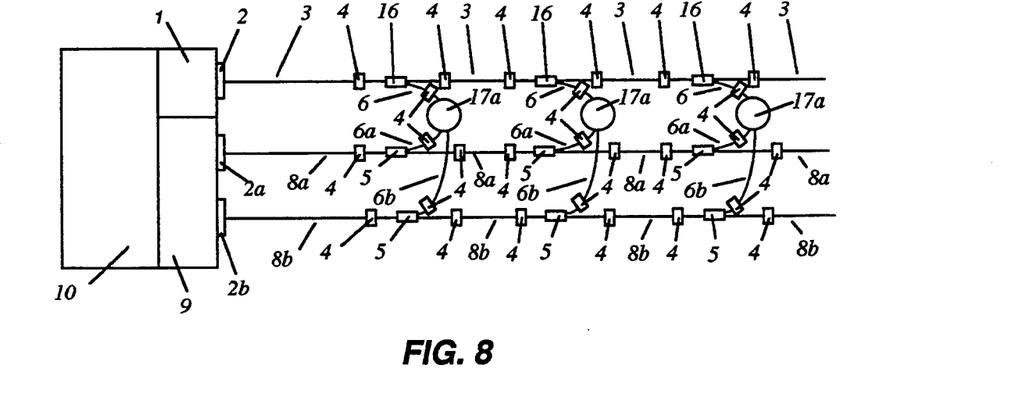
FIG. 8 is a schematic diagram of a self-routing transmissive optical multiplexing system embodiment according to the present invention.

Referring to FIG. 8, a schematic diagram of an electrically passive transmissive self-routing time division optical multiplexing system is shown, representing the first preferred embodiment of the present invention. In this case, an optical light beam is produced by the optical source module, 1, after receiving a control signal from the control and signal processing module, 10. As illustrated in FIG. 3, the optical light beam has the form of a step impulse in which the rise time from 0 to a constant power level is determined by the characteristics of the photoactivated optical switches, 16, with particular regard to their time constants, t. The photoactivated optical switches are of the delta beta type as illustrated in FIG. 6 and as described by Li Kam Wa et al in *Electron. Lett.* vol. 21, p. 26, 1985. Other variants are evidenced in FIGS. 4, 5 and 7. The optical light beam is coupled to the source module via a bulkhead single mode optical fiber coupler, 2, into an outwardly directed optical transmission path, 3, consisting of single mode optical fiber. The light beam travels along the outwardly directed optical transmission path, 3, passes through a single mode optical fiber connection, 4, consisting of a connector or a splice and reaches a first electrically passive photoactivated optical switch, 16. A schematic diagram of such a delta beta switch is shown in FIG. 6. The optical light beam from the outwardly directed optical transmission path, 3, is coupled into the switch, 16, where it can be directed either into a channel connected to the alternate optical transmission path, 6, or into a second channel connected to the outwardly directed optical transmission path, 3, via signal mode optical connections, 4. A graph showing the characteristic response of a generic, to wit, any electrically passive photoactivated switch, as depicted in FIG. 2, is shown in FIG. 3. As can be seen, upon illumination with a step impulse optical light beam, substantially all of the optical power in the beam is coupled into the alternate optical transmission path, 6. After a characteristic period of time, t, substantially all of the optical power in the beam is switched from the alternate optical transmission path, 6, back into the outwardly directed optical transmission path, 3. In the first preferred embodiment depicted in FIG. 8, then, the first photoactivated optical switch, 16, initially directs substantially all of the power in the optical light beam into the first alternate optical transmission path, 6, after it passes through a single mode optical connection, 4. The light beam is then modulated by a transmissive optical modulation device, a Mach-Zehnder interferometer, 17a, in the alternate optical transmission path, 6. Such interferometers have been successfully utilized for acoustic detection as has been described by Dandridge and Kersey in Proc. of SPIE Vol 985, "Fiber Optic and Laser Sensors VI", p. 34, 1988. One output from the interferometer is then coupled into an output channel, 6a, and then into a first inwardly directed optical transmission path, 8a, consisting of a single mode optical fiber after having first passed through a single mode optical connection, 4, an optical splitter/combiner, 5, and a second single mode optical connection, 4. The optical light beam travels along the first inwardly directed optical transmission path, 8a, until it reaches bulkhead optical connection, 2a and the optical signal is detected by photodetection module, 9. The second output from the interferometer, 17a, is coupled into an output channel 6b, and then into a second inwardly directed optical transmission path, 8b, consisting of a single mode optical fiber, after having first passed through a single mode optical connection, 4, an optical splitter/combiner, 5, and a second single mode optical connection, 4. The second optical light beam travels along the second inwardly directed optical transmission optical transmission path, 8b, until it is detected by the photodetection module, 9, after having first passed through bulkhead optical connection, 2b. After a time t, the first photoactivated optical switch redirects substantially all of the optical light beam from the alternate optical transmission path, 6, back to the outwardly directed optical transmission path, 3, via a signal mode optical connection, 4. Substantially all of the power in the optical light beam then travels along the outwardly directed optical transmission path, 3, until it passes through a single mode optical connection, 4 and reaches a second electrically passive photoactivated optical switch, 16. The second photoactivated optical switch directs substantially all of the power in the optical light beam through an optical connection, 4, into a second alternate optical transmission path, 6. Again, the light beam is modulated by a Mach-Zehnder interferometer, 17a, in the second alternate optical transmission path, 6. One output from the interferometer is then coupled into the first inwardly directed optical transmission path, 8a, via a single mode optical connection, 4, the optical splitter combiner, 5 and a second single mode optical connection, 4. The optical light beam travels along the inwardly directed optical transmission path, 8a, until it reaches the photodetection module, 9 through bulkhead optical connection, 2a, where the optical signal is detected. The second output from the interferometer, 17a, is coupled into the second inwardly directed optical transmission path, 8b, via a single mode optical connection, 4, the optical splitter/combiner, 5, and a second single mode optical connection, 4. The optical light beam travels along the second inwardly directed optical transmission path, 8b, until it reaches the photodetection module, 9, through bulkhead optical connection, 2b, where the optical signal is detected. These signals, however, arrive at a later time than the ones that had traveled through the first alternate optical transmission path. After a time, t, the second photoactivated optical switch redirects substantially all of the optical light beam from the second alternate optical transmission path back to the outwardly directed optical transmission path, 3 via a single mode optical connection, 4. Substantially, all of the power in the optical light beam then travels along the outwardly directed optical transmission path, 3, until it passes through a single mode optical connection, 4 and reaches a third electrically passive photoactivated optical switch, 16 and the above-described process continues sequentially until the optical light beam has passed through all of the alternate optical light paths and optical modulation devices in the system. The photodetection module, 9, demodulates the detected optical signals into useful electrical signals according to the modulation characteristics of the optical modulation devices, the Mach-Zehnder interferometers, 17a, used in the system. The control and signal processing electronics module, 10, initiates the optical light beam coupled into the system and windows the output from the photodetection module, 9, according to the rise time of the optical light beam, the characteristic switching time, t, and corrects, if necessary, for travel times through the different alternate optical transmission paths. The control and signal processing electronics module, 10, then provides a sequence of electrical output signals corresponding to the modulation produced by the distinct optical modulation devices in the system. The control and signal processing electronics, 10, then turns off the optical light beam for a long enough period of time for the photoactivated optical switches to all reset themselves to their unilluminated condition. The whole interrogation process is then repeated.

Figure 9:
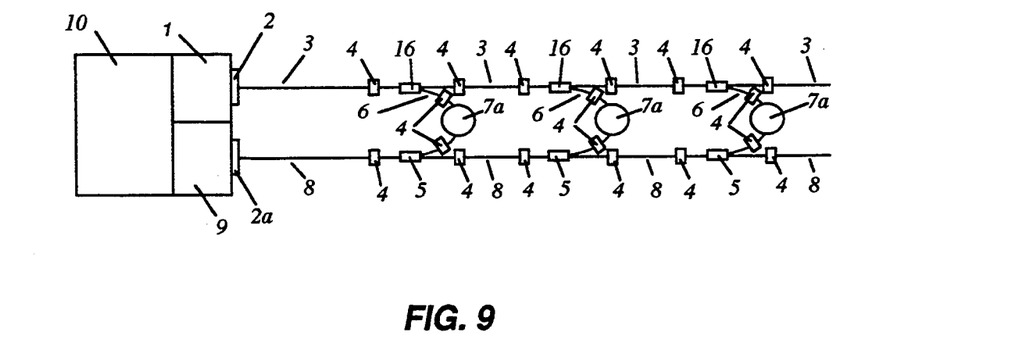
FIG. 9 is a schematic diagram of a self-routing transmissive optical multiplexing system which is distinct from the embodiment depicted in FIG. 8 above and which represents a second embodiment according to the present invention.

Referring to FIG. 9, a schematic diagram of an electrically passive transmissive self-routing time division optical multiplexing system is shown, representing the second preferred embodiment of the present invention. In this case, an optical light beam is produced by the optical source module, 1, after receiving a control signal from the control and signal processing module, 10. The optical light beam has the form of a step impulse in which the rise time from 0 to constant power level is determined by the characteristics of the photoactivated optical switches, 16, particularly, their time constants, t. The photoactivated switches, 16, once again can be of any type for example, those as shown in FIGS. 4, 5, 6 and 7 as long as they have as these do the operational characteristic shown in FIG. 3. The optical light beam is coupled by the source module via a bulkhead single mode or or multimode optical fiber coupler, 2, into an outwardly directed optical transmission path, 3, consisting of optical fiber. The light beam travels along the outwardly directed optical transmission path, 3, passes through an optical fiber connection, 4 consisting of a connector or a splice and reaches a first electrically passive photoactivated optical switch, 16. The optical light beam from the outwardly directed optical transmission path, 3, is coupled into the switch, 16 where it can be directed either into a channel connected to the alternate optical transmission path, 6, or into a second channel connected to the outwardly directed optical transmission path, 3, via single mode or multimode optical connections, 4. In the second preferred embodiment depicted in FIG. 9, then, the first photoactivated optical switch, 16 directs substantially all of the power in the optical light beam into the first alternate optical transmission path, 6, after it passes through an optical connection, 4. The light beam is then modulated by a transmissive optical modulation device, 7a, to wit, a single mode or multimode modulation device in the alternate optical transmission path, 6. The output from the modulation device, 7a, is then coupled into the inwardly directed optical transmission path, 8, an optical fiber, after having first passed through an optical connection, 4, an optical splitter/combiner, 5, and an additional optical connection, 4. The optical light beam travels along the inwardly directed optical transmission path, 8, until it reaches the photodetection module, 9, after passing through a bulkhead optical connector, 2a, and the optical signal is detected. After a time, t, the first photoactivated optical switch redirects substantially all of the optical light beam from the alternate optical transmission path, 6, back to the outwardly directed optical transmission path, 3, via a single mode or multimode optical connection, 4. Substantially all of the power in the optical light beam then travels along the outwardly directed optical transmission path, 3, until it passes through a single mode or multimode optical connection, 4 and reaches a second electrically passive photoactivated optical switch, 16. The second photoactivated optical switch, 16, directs substantially all of the power in the optical light beam through an optical connection, 4, into a second alternate optical transmission path, 6. Again, the light beam is modulated according to some property of the light beam such as its intensity, spectral distribution or polarization state by a single mode or multimode transmissive optical modulation device, 7a, in the second alternate optical transmission path, 6. The output from this modulation device, 7a, is then coupled into the inwardly directed optical transmission path, 8, via an optical connection, 4, an optical splitter/combiner, 5, and a second optical connection, 4. The optical light beam travels along the inwardly directed optical transmission path, 8, until it reaches the photodetection module, 9, through bulkhead optical connector, 2a where the optical signal is detected. This signal, however, arrives at a later time than the one that had traveled through the first alternate optical transmission path. After a time, t, the second photoactivated optical switch redirects substantially all of the optical light beam from the second alternate optical transmission path, 6, back to the outwardly directed optical transmission path, 3. This process continues sequentially until the optical light beam has passed through all of the alternate optical light paths and optical modulation devices in the system. The photodetection module, 9, demodulates the detected optical signals into useful electrical signals according to the modulation characteristics of the optical modulation devices, the transmissive fiber optic modulators, used in the system. The control and signal processing electronics module, 10, initiates the optical light beam coupled into the system and windows the output from the photodetection module, 9, according to the rise time of the optical light beam, the characteristic switching time, t, and corrects, if necessary, for travel times through the successive alternate optical transmission paths. The control and signal processing electronics module, 10, then provides a sequence of electrical output signals corresponding to the modulation produced by the optical modulation devices, 7a, in the system. The control and signal processing electronics, 10, then turns off the optical light beam for a long enough period of time for the photoactivated optical switches to all reset themselves to their unilluminated condition. The whole interrogation process is then repeated.

Figure 10:
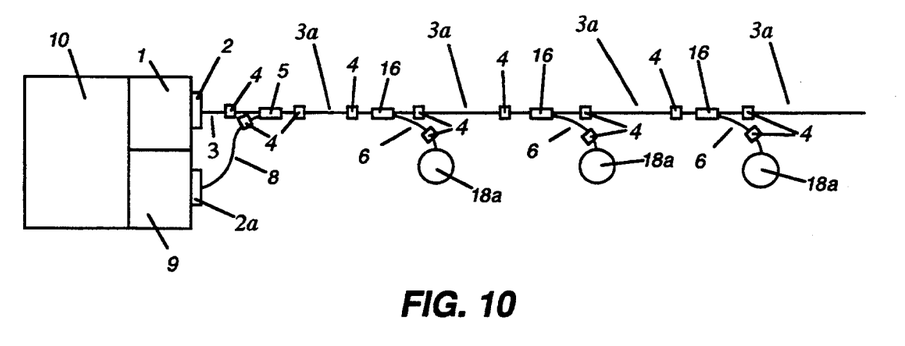
FIG. 10 is a schematic diagram of a self-routing reflective optical multiplexing system which is distinct from the embodiment depicted in FIG. 8 above and which represents a third embodiment according to the present invention.

FIG. 10 depicts a third preferred embodiment of the present invention. In this case, an optical light beam is produced by the optical source module, 1, after receiving a control signal from the control and signal processing module, 10. The optical light beam has as per FIG. 3 the form of a step impulse in which the rise time from 0 to constant power level is determined by the characteristics of the photoactivated optical switches, 16, respective variants of which are illustrated once again in FIGS. 4, 5, 6 and 7, particularly, their time constants, t. The optical source module, 1, couples a step impulse optical light beam through a bulkhead optical connector, 2, into the outwardly directed optical transmission path, 3a, and into one arm of the passive optical splitter/combiner, 5, after it passes through an optical connection, 4. The optical splitter/combiner, 5 directs the light beam through an optical connection, 4, into a bidirectional optical transmission path, 3a until it reaches an optical connection, 4, and a first electrically passive photoactivated optical switch, 16. The photoactivated optical switch, 16 directs substantially all of the power in the optical light beam through an optical connection, 4, and into the alternate optical transmission path, 6. Some property of the light beam, such as its intensity, spectral distribution or polarization state, is then modulated by the reflective optical modulation device, 18a, in the alternate optical transmission path 35 and then reflected back through optical connection, 4, toward the photoactivated optical switch, 16 along the alternate optical transmission path, 6. The modulated optical light beam is then coupled into the bidirectional optical transmission path, 3a, via the photoactivated optical switch 16, after passing through optical connection, 4, but in a direction toward the optical source until it passes through an optical connection, 4, and reaches the passive optical splitter/combiner, 5, where a substantial portion of its optical power is directed into the inwardly directed optical transmission path, 8, via an optical connection, 4, and then into the photodetection module, 9, via a bulkhead optical connection, 2, and the optical signal is detected. After a time t, the photoactivated optical switch, redirects substantially all of the optical light beam from the alternate optical transmission path, 6, through an optical connection, 4, and back to the bidirectional optical transmission path, 3a, in a direction away from the optical source. Substantially all of the power in the optical light beam then travels along the bidirectional optical transmission path, 3a, until it passes through an optical connection, 4, and reaches a second electrically passive photoactivated optical switch, 16. The second photoactivated optical switch directs substantially all of the power in the optical light beam into a second alternate optical transmission path, 6. Again, some property of the light beam, such as its intensity, spectral distribution or polarization state, is then modulated by a reflective optical modulation device, 18a, in the alternate optical transmission path, 6, and reflected back through an optical connection, 4, toward the photoactivated optical switch, 16. The modulated optical light beam is then coupled through an optical connection, 4, into the bidirectional optical transmission path, 3a, via the photoactivated optical switch, 16, but also in a direction toward the optical source. The optical light beam travels along the bidirectional optical transmission path, 3a, until it passes through an optical connection, 4, and reaches the passive optical splitter/combiner, 5, where a substantial portion of its optical power is directed through an optical connection, 4, and into the inwardly directed optical transmission path, 8, and then through the bulkhead optical connection, 2 and into the photodetection module, 9, where the optical signal is detected. This signal, however, arrives at a later time than the one that had traveled through the first alternate optical transmission path. After a time t, the second photoactivated optical switch redirects substantially all of the optical light beam from the second alternate optical transmission path back to the bidirectional optical transmission path, 3a, through optical connection, 4, but in a direction away from the optical source. This process continues sequentially until the optical light beam has passed through all of the alternate optical light paths and optical modulation devices in the system. The photodetection module, 9, demodulates the detected optical signals into useful electrical signals according to the modulation characteristics of the optical modulation devices used in the system. The control and signal processing electronics module, 10, initiates the optical light beam coupled into the system and windows the output from the photodetection module, 9, according to the rise time of the optical light beam, the characteristic switching time, t, and corrects, if necessary, for travel times through the different alternate optical transmission paths. The control and signal processing electronics module, 10, then provides a sequence of electrical output signals corresponding to the modulation of the distinct optical modulation devices in the system. The control and signal processing electronics then turns off the optical light beam for a long enough period of time for the photoactivated optical switches, 16, to all reset themselves to their unilluminated condition. The whole interrogation process is then repeated.

Figure 11:
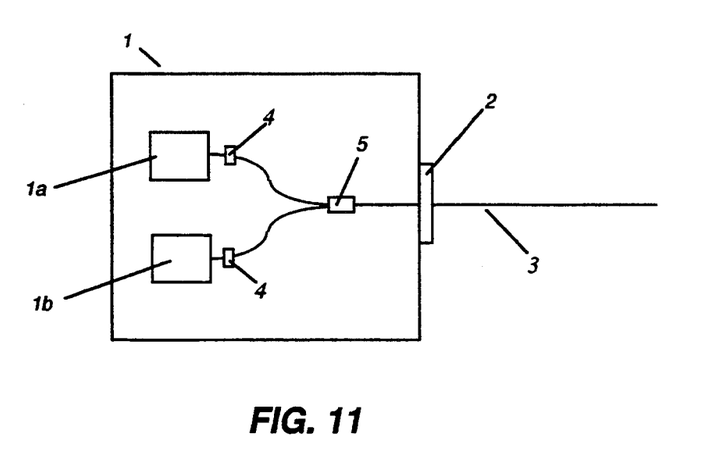
FIG. 11 is a schematic diagram of a dual wavelength source module for the embodiments shown in FIGS. 8, 9 and 10.

The three preferred embodiments described above can also function with electrically passive photoactivated optical switches whose switching is produced by an optical signal at a wavelength distinct from the optical signal transmitting the modulation dam. This can be done if the optical source module is configured to contain two optical sources as shown in FIG. 11. In this case, the outputs from two optical sources, 1a and 1b are connected with optical connections, 4, together via a passive optical splitter/combiner, 5, and directed toward the outwardly directed optical transmission path, 3.

While the present invention has been described with reference to three specific embodiments involving transmissive and reflective system architectures, those having ordinary skill in this field will understand that various other modifications may be made which would not depart from the teachings of this invention or the scope of protection afforded by the appended claims. All such equivalent structures are intended to be included within the scope of protection afforded to this invention. In particular, architectures which involve combinations of transmissive, reflective and star configurations are to be considered to be included. A star configuration can be easily seen by those having ordinary skill in the art to be special cases of the reflective embodiment in which the electrically passive photoactivated optical switches are co-located and the transmissive embodiment in which the electrically passive photoactivated optical switches are co-located in one location and the passive optical couplers are co-located in another.

The three preferred embodiments according to the present invention demonstrate that it can provide significant advantages over existing passive optical multiplexing system due to the fact that each directs substantially all of the optical power existing in the system to each modulation device in sequence thereby guaranteeing that each device can provide the maximum possible signal-to-noise ratio to the photodetection module while at the same time having minimal crosstalk between its signals and those of other optical modulation devices within the system. A further advantage occurs because the architectures of the present invention are self-routing, thereby greatly reducing the complexity and cost of the system electronics.

While the invention has been described in connection with what is presently considered to be the most practical and preferred embodiments, it is to be understood that this invention is not limited to the disclosed embodiments, but on the contrary is intended to cover various modifications and equivalent arrangements included within the spirit and scope of the appended claims. Persons of ordinary skill in this field will readily understand that all such equivalent structures and arrangements are contemplated to be within the scope of the following claims.

I claim:

1. A self-routing electrically passive optical multiplexing system, comprising:
   a. an optical source module;
   b. an outwardly directed optical transmission path;
   c. a plurality of alternate optical transmission paths;
   d. an inwardly directed optical transmission path;
   e. a plurality of electrically unpowered photoactivated optical switches sequentially located in said outwardly directed optical transmission path such that upon illumination from said optical source module each of said switches initially switches substantially all of the optical power each of said switches receives from said outwardly directed optical transmission path to one of said alternate optical transmission paths for a characteristic period of time before redirecting substantially all of the optical power received from said outwardly directed optical transmission path back along said outwardly directed optical transmission path;
   f. a plurality of optical modulation devices each positioned in one each of said alternate optical transmission paths serving to modify some characteristic of the optical power traveling along said path;
   g. a plurality of optical coupling devices that redirect optical power from each one of said alternate optical transmission paths into said inwardly directed optical transmission path;
   h. a photodetection module;
   i. a control and signal processing module electronically connected to said optical source module and said photodection module.

2. The self-routing electrically passive optical multiplexing system of claim 1 in which the outwardly directed and inwardly directed optical paths are one and the same path and said photoactivated optical switches serve identically as the optical coupling devices.

3. The self-routing electrically passive optical multiplexing system of claim 1 in which said photoactivated optical switches are opto-mechanical switches.

4. The self-routing electrically passive optical multiplexing system of claim 1 in which said photoactivated optical switches are bulk optical switches.

5. The self-routing electrically passive optical multiplexing system of claim 1 in which said photoactivated optical switches are integrated optical switches.

6. The self-routing electrically passive optical multiplexing system of claim 1 in which said photoactivated optical switches are hybrid switches containing electronic components.

7. The self-routing electrically passive optical multiplexing system of claim 1 in which said photoactivated optical switches are activated by optical power at a wavelength distinct from a data transmitting optical signal wavelength, optical signals of both said wave lengths being provided by the said optical source module.

8. A self-routing electrically passive optical multiplexing system comprising.
   a. an optical source module;
   b. an outwardly directed optical transmission path;
   c. a plurality of alternate optical transmission paths;
   d. a plurality of inwardly directed optical transmission paths;
   e. a plurality of electrically unpowered photoactivated optical switches sequentially located in said outwardly directed optical transmission path such that upon illumination from said optical source module each of said switches initially switches substantially all of the optical power each of said switches receives from said outwardly directed optical transmission path to one of said alternate optical transmission paths for a characteristic period of time before redirecting substantially all of the optical power received from said outwardly directed optical transmission path back along said outwardly directed optical transmission path;
   f. a plurality of optical modulation devices each positioned in one each of said alternate optical transmission paths serving to modify some characteristic of the optical power traveling along said path;
   g. a plurality of optical coupling devices that redirect optical power from each one of said alternate optical transmission paths into each of said inwardly directed optical transmission paths;
   h. a photodetection module;
   i. a control and signal processing module electronically connected to said optical source module and said photodection module.

9. The self-routing electrically passive optical multiplexing system of claim 8 in which said photoactivated optical switches are opto-mechanical switches.

10. The self-routing electrically passive optical multiplexing system of claim 8 in which said photoactivated optical switches are bulk optical switches.

11. The self-routing electrically passive optical multiplexing system of claim 8 in which said photoactivated optical switches are integrated optical switches.

12. The self-routing electrically passive optical multiplexing system of claim 8 in which said photoactivated optical switches are hybrid switches containing electronic components.

13. The self-routing electrically passive optical multiplexing system of claim 8 in which said photoactivated optical switches are activated by optical power at a wavelength distinct from a data transmitting optical signal wavelength, optical signals of both said wave lengths being provided by the optical source module.

* * * * *